Patented Oct. 23, 1951

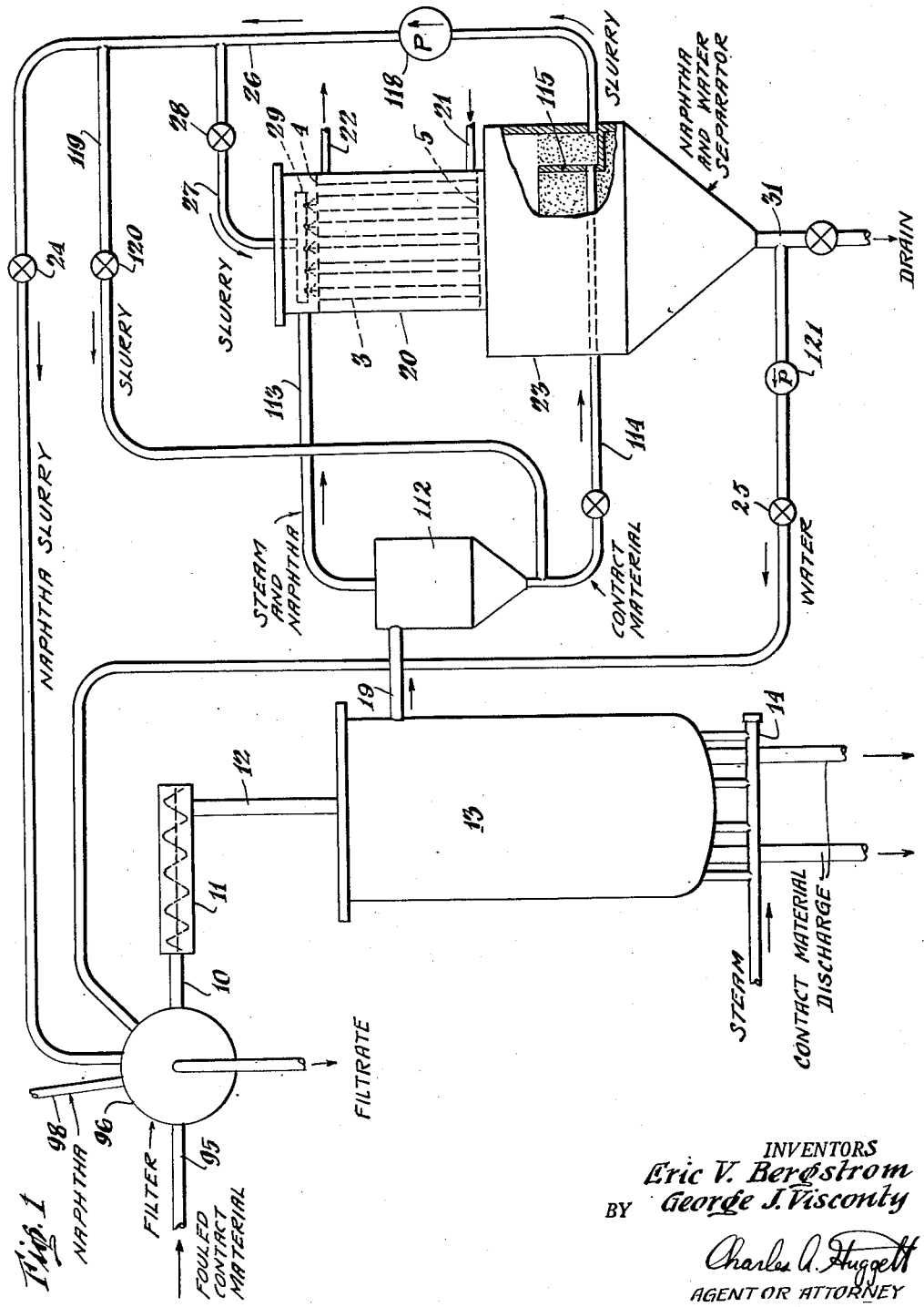

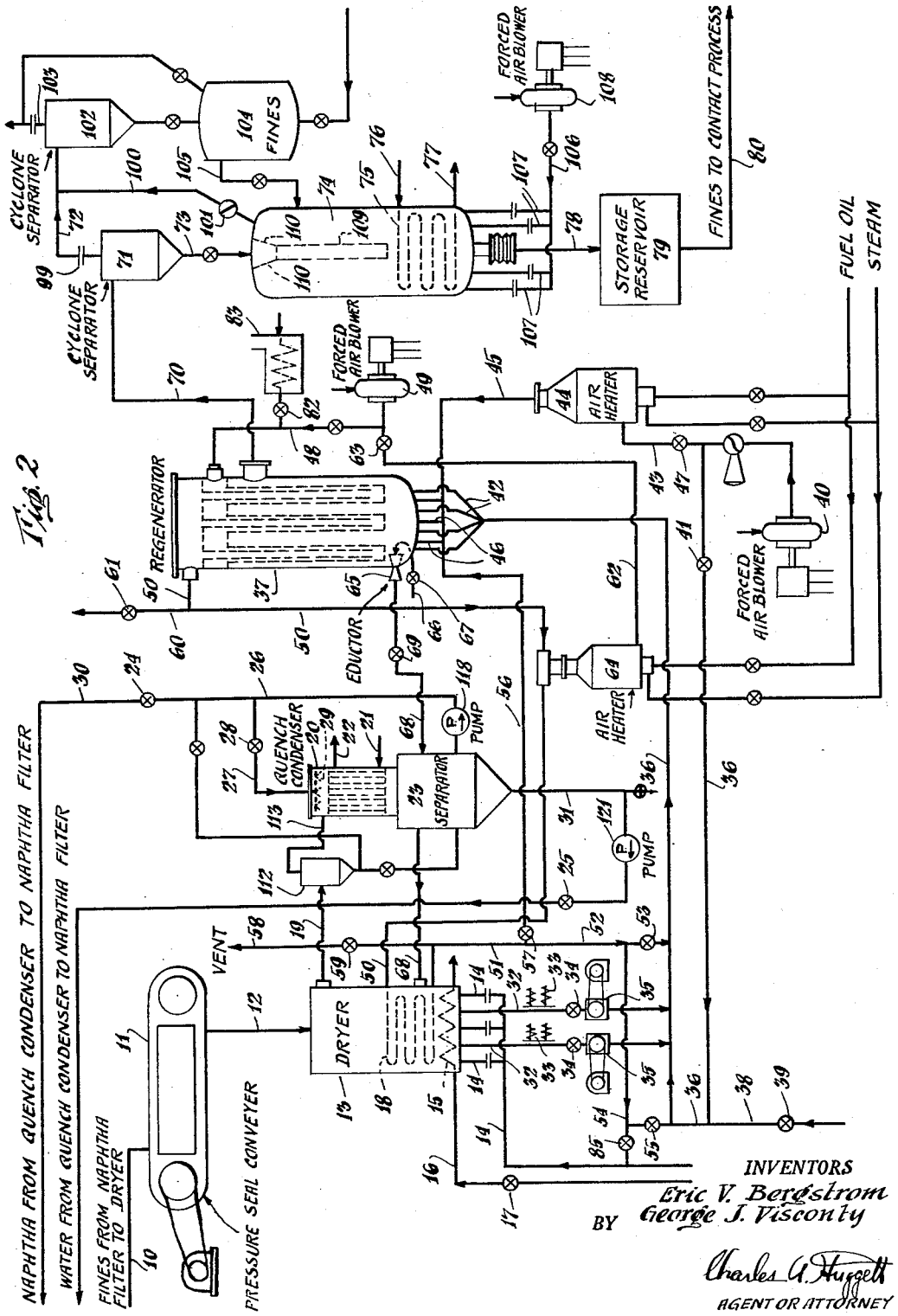

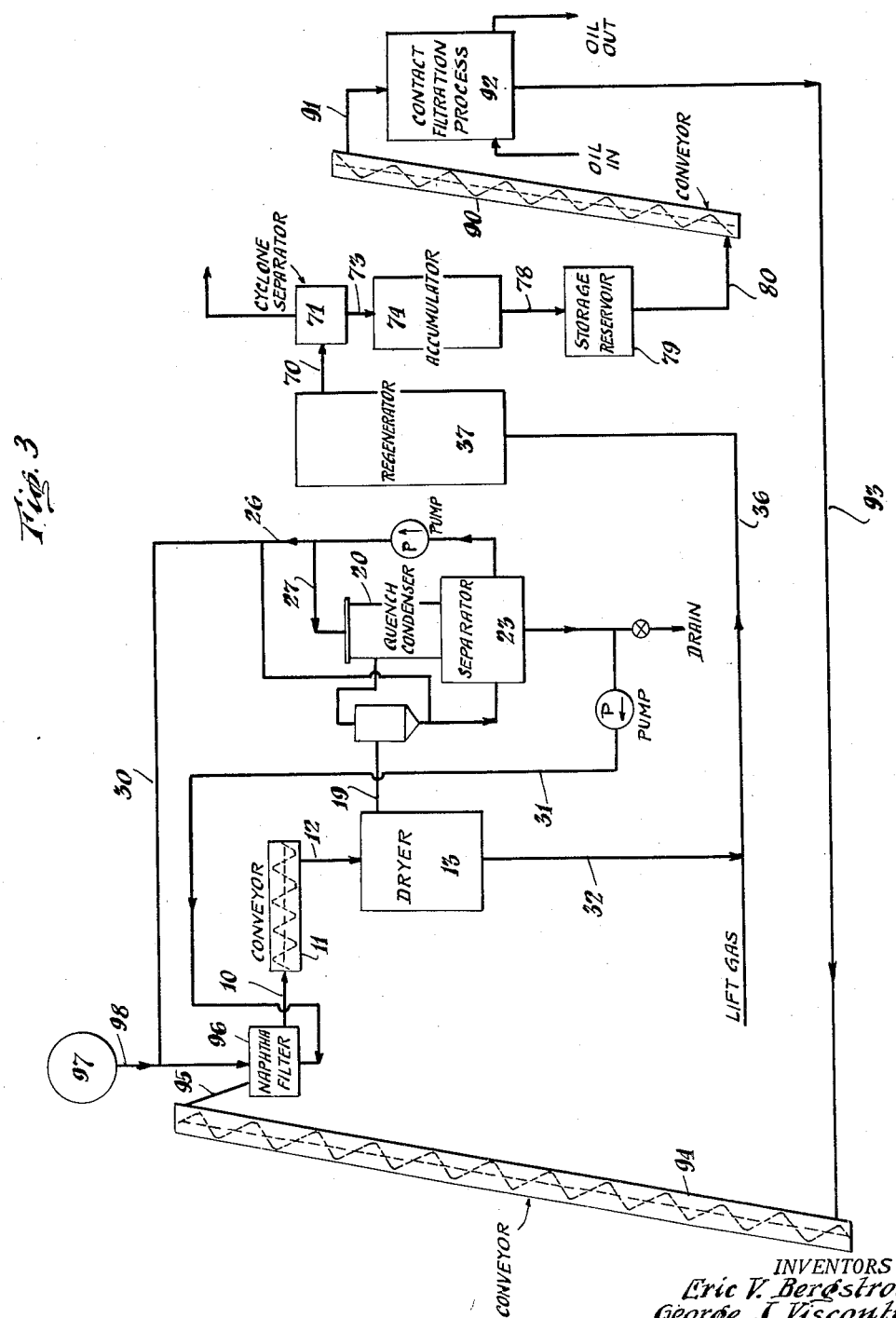

2,572,433

UNITED STATES PATENT OFFICE 2,572,433

CONTINUOUS CONTACT FILTRATION

Eric V. Bergstrom, Short Hills, and George J. Visconty, Clarksboro, N. J., assignors to Socony-Vacuum Oil Company, Incorporated, a corporation of New York Application November 25, 1949, Serial No. 129,452

2 Claims. (Cl. 196—147)

This application is directed to an improved process and apparatus for the continuous contacting of adsorbent powdered material with oils. The application refers more particularly to a continuous contact refining process for treating oils to remove gum-forming compounds, color bodies and other objectionable material, as disclosed in copending application Serial Number 100,588.

The materials generally used as the pulverized or powdered adsorbent are clays such as fuller's earth, silica gels, bauxites, montmorillonites, activated charcoal, and certain synthetic associations of silica and alumina to which other materials, such as certain metallic oxides, may be added. This material should be pulverized to a grain size which will pass through a 100-mesh Tyler screen and preferably within the range of about 150–400 mesh size.

In these filtration processes, the powdered material becomes fouled by the deposition of carbonaceous material and oily constituents upon its surface. By the use of solvents such as naphtha, low boiling alcohols and ketones, some of the contaminants can be removed, but the operation is too costly and inefficient to be considered commercially practical. The usual custom in this art is to subject the spent adsorbent material to a combination of steaming and naphtha washing to effect removal of the oily constituents from the adsorbent, after which the naphtha may be distilled off in a rotary drum kiln followed by burning of the contaminants in another mechanically driven kiln. This procedure has not proved satisfactory, partly because of the high heat cost involved in distilling the naphtha from the adsorbent particles.

The object of this invention is to provide an improved continuous contact filtration process.

A further object of this invention is to provide a method for using fluid drying principles in a continuous contact filtration process without losing any substantial amount of solvent or contact material.

These and other objects of this invention will be made apparent by the following description read in view of the attached drawings, in which;

Figure 1 is a diagrammatic representation of the solvent and contact material recovery apparatus and process with which this invention is intimately concerned.

Figure 2 is a highly diagrammatic and schematic view of apparatus adapted to continuously revivify spent adsorbent contact material, fouled from use in a filtration process, and incorporating the particular apparatus and process set forth in Figure 1.

Figure 3 is a diagrammatic sketch showing the relationship of the elements of a continuous contact filtration process, the elements being represented in block form.

In the contact filtration process for decolorization, etc. such as the decolorization of petroleum oils, for example, pulverized contact material is admitted to a vessel containing the oil. The mixture is agitated to assure even distribution of the contact material in the oil. The adsorbent particles pick up the objectionable material from the oil, and the filtered oil is removed continuously from the vessel. When the particles of adsorbent become fouled to the extent that their filtering efficiency is reduced materially, they are removed from the vessel. The fouled contact material is passed through one or more solvent washing, and filtering steps, and is then introduced into the apparatus shown on Figure 2, described herebelow.

Referring now to Figure 2, contact material from the naphtha filter is passed through conduit 10 to the pressure seal conveyor 11. The conveyor, of the Redler type, permits the maintenance of a pressure differential between its entrance and exit and is readily adaptable to this contact filtration process, although other suitable conveyors are available.

The contact material is fed through conduit 12 from the conveyor 11 into the dryer 13. The dryer 13 may suitably be a vertically mounted vessel of circular cross section. Steam is introduced into the lower section of the dryer 13, through conduit 14 to maintain the contact material within the dryer in ebullient motion. The steam may be admitted to the dryer 13 through a multiplicity of conduits 14, suitably spaced across the bottom of the vessel to provide more even distribution, as shown on Figure 1. Orifice means 15 may be installed in the conduits 14 to increase the velocity of the steam, hereby providing better mixing in the dryer. The steam has a dual purpose in that in addition to providing support for the contact material it acts as a stripping fluid, removing some of the more volatile materials from the contact material. Of course the steam admitted to the dryer 13 through the conduits 14 may be sufficiently hot to impart at least some of the heat to the contact material to volatilize some of the heavier oily constituents on the surface thereof. In addition, a heating coil 15 is located near the bottom of the dryer 13 to provide heat when desired.

Steam is admitted through the coil 15 by means of the steam conduit 16, the amount being controlled by the valve 17. But the major source of heat in the dryer in this invention is from the heating coils 18 located in the lower section of the dryer. The source of heat for the coils 18 will be described hereinafter. The coils 18 may be coiled tubes or a bank of conduits, adapted to provide suitable heat transfer. The steam and vapors within the dryer may be removed from an outlet near the top thereof through a conduit 19.

The dried contact material is removed from the bottom of the drier through the conduits 32, 32. Vibrators 33, 33, or other suitable means, are installed in the outlet conduits 32, 32 to prevent packing or bridging of the contact material therein. The flow of material in conduits 32, 32 may be controlled by valves 34, 34 but is normally controlled by continuous feeders 35, 35 of the star valve type. The contact material is thereafter fed into the conduit 36 for transmission to the regenerator 37. The contact material in the conduit 36 is carried by a suitable lift gas, which may be steam or an inert gas admitted through the conduit 38 controlled by the valve 39. The lift gas can also be air admitted to the conduits by the blower 40, controlled by the valve 41.

The regenerator 37 is a vertically mounted vessel of circular, rectangular or other suitable cross section. The contact material supported by the lift gas is admitted to the bottom of the regenerator through a multiplicity of conduits 42, 42, located to distribute the material equally across the cross-sectional area of the vessel. An alternate or concomitant supply of combustion supporting gas is provided from blower 40 through the conduit 43. The gas is passed through a suitable air heater 44 and through the conduit 45, to another group of entrance conduits 46, 46 also equally distributed across the bottom of the regenerator 37 to provide improved distribution. The gas flow in this line is controlled by the valve 47. The operation of the regenerator 37 is described in more detail in the copending application for Letters Patent, Serial Number 95,713, filed May 27, 1949. Heat is extracted from the regenerator 37 by passing a cooling fluid through a heat exchanger located within said vessel. The heated cooling fluid is then passed through the exchanger 18 located in the dryer to provide the major portion of the heat required to dry the contact material.

The regenerated contact material is removed from the regenerator 37 through the conduit 70, as previously described. The regenerated contact material is separated from the gas by a method fully disclosed in the copending application for Letters Patent. The separated, regenerated contact material is then returned to the contact filtration process for reuse.

Referring now to Figure 3, the sequence of the steps of a complete contact filtration process is shown with the major elements indicated in block diagrammatic form. From the naphtha filter 96 the contact material is passed to the conveyor 11 through the conduit 10. From the conveyor 11 the material is passed to the dryer 13 through the conduit 12, as previously indicated. The material from the dryer 13 is introduced into the conduit 36 through the conduit 32, where it is carried by the lift gas to the bottom of the regenerator 37. The contact material, after regeneration, is separated from the gas in apparatus such as the separator 71 and accumulator 74. The contact material is thereafter brought into contact with the oil in the treating step and the fouled contact material is withdrawn from the treating step and returned to the naphtha filter 96.

This invention is concerned primarily with the method of recovering the fines and solvent removed from the dryer 13 with the steam used to fluidize and strip the contact material. In order that this continuous contact filtration process be commercially feasible, it is essential that the contact material and solvent be recovered and returned to the system in an economical manner. The method of accomplishing this aim is shown diagrammatically on Figure 1.

Referring to Figure 1, the fouled contact material from the treating step is introduced into the filter 96 where it is washed with naphtha admitted through the conduit 98. The wet contact material is withdrawn through the conduit 10 and conveyor 11. The contact material, discharged from the conveyor 11, is introduced into the top of the dryer 13 through the conduit 12. Steam is introduced into the bottom of the dryer through the conduit 14. The velocity of the incoming steam is controlled to maintain the contact material in the dryer in ebullient motion. The steam and naphtha are removed from the dryer through the conduit 19. In addition, a small portion of the contact fines are removed with the gases, entrained therein. The gases and entrained contact material are introduced into the cyclone separator 112. The gases, substantially freed of contact material, pass overhead through the conduit 113 to the upper section of the quench condenser 20 and the separated contact material is withdrawn from the bottom of the cyclone separator 112 through the conduit 114.

Within the quench condenser 20 is located a series of vertical heat-exchanger tubes, 3 connected to upper and lower tube sheets 4, 5. A cooling fluid, such as water, is introduced through the conduit 21 into the space surrounding the tubes and the fluid is withdrawn from the upper portion of the condenser 20 through the conduit 22. The gases, passing downwardly through the tubes of the heat exchanger, are cooled and condense to form, for the most part, liquid naphtha and water. A small portion of the contact fines are carried over from the cyclone separator and tend to settle out on the walls of the condenser tubes, thereby reducing the cooling efficiency of the tubes. A header 29 is located in the upper portion of the quench condenser 20. The header 29 is equipped with a series of orifices adapted to spray liquid naphtha slurry, described hereinafter, into the interior of the tubes to wash down the settled contact material and improve the condensing efficiency of the quench condenser. The vapors, converted to liquid water and naphtha, for the most part, by the cooling action of the condenser, settle in the bottom of the separator 23, which is constructed of materially larger cross section than the condenser to permit settling and separation to occur. The separator 23 is located directly below the quench condenser, and communicates therewith. The liquid level in the separator 23 is controlled by operation of the valves 24 and 25 at a predetermined level, adequate to provide efficient separation. The naphtha, being lighter than the other material, rises to the top and flows over the inner wall of the trap tray 115, located on the inside wall of the separator 23. The water level in the separator is maintained well below the top of the trap tray 115. The contact material, removed from the bottom of the cyclone separator 112 through the conduit 114, is introduced into the trap tray 115 to form a slurry with the naphtha.

The naphtha slurry is withdrawn from the trap tray 115 through the conduit 26 by the pump 118. The major portion of the slurry is returned to the top of the rotating drum filter 96. A small portion of the naphtha slurry is sprayed into the top of the quench condenser 20 through the conduit 27 and leader 29, as previously described. The flow of naphtha slurry is controlled by the valve 28 to provide sufficient material in the condenser to wash the condenser tubes free of accumulated contact material. Another small portion of the naphtha slurry is fed through the conduit 119 to the bottom of the cyclone separator 112 to carry the contact material through the conduit 114 into the trap tray 115. This flow is controlled by the valve 120.

The water and entrained contact material are withdrawn from the bottom of the separator 23 through the conduit 31 and discarded. The concentration of fines in the water is sufficiently low to permit the discard of these fines with the waste water, without making the process uneconomical.

As previously described, the fouled contact material is disengaged from the oil undergoing treatment in the treating step and brought into contact with naphtha in one or more solvent washing and filtering steps. For example, the fouled contact material can be introduced to the rotary drum filter 96 through the conduit 95, wherein it is sprayed with solvent naphtha through the conduit 98. The naphtha passes through the filter in a manner well known in this art. The washed contact material is removed from the filter 96 through the conduit 10 and conveyer 11, and introduced into the top of the dryer 13 through the conduit 12, as previously described.

The specific example shown above, is only intended to be illustrative of the invention. The only limitations intended are those presented in the following claims.

What is claimed is:

1. In a continuous contact filtration process wherein adsorbent contact material has become deactivated by liquid phase contact with oil in a treating step, the fouled contact material removed from the oil, washed with naphtha and filtered, and then introduced into a drying zone wherein it is stripped of naphtha and maintained in ebullient motion by steam introduced into the bottom of said zone, the method of recovering the naphtha and entrained contact material withdrawn from the drying zone with the effluent steam therefrom which comprises: separating the major portion of the contact material from the naphtha and steam in a first separation zone, introducing the naphtha and steam with a minor portion of the contact material still entrained therein into a condensing zone, bringing the naphtha and steam into indirect heat exchange relationship with a cooling fluid in said condensing zone to condense the naphtha and steam, spraying a small amount of a slurry of liquid naphtha and contact material into said condensing zone to wash the zone free of accumulated contact material, withdrawing the condensed naphtha and water and contact material admixed therewith from said condensing zone, separating the naphtha from the water and admixed contact material, mixing contact material from the first separation zone with the condensed and separated naphtha to form a slurry, mixing a small portion of the slurry with the contact material first separated from the naphtha and steam to aid in moving said contact material to the locus of slurry mixing, introducing another small portion of the slurry into the condensing zone to serve as the previously described washing medium, and mixing the remaining slurry with the fouled contact material withdrawn from the treating step whereby the major portion of the naphtha and contact material is returned to the process.

2. In a continuous contact filtration process wherein adsorbent contact material has become deactivated by liquid phase contact with oil in a treating step, the spent contact material removed from the oil, washed with solvent and filtered, and then introduced into a drying zone wherein it is stripped of solvent and maintained in ebullient motion by steam introduced into the zone, the method of recovering the solvent and entrained contact material withdrawn from the drying zone with the effluent steam therefrom which comprises: separating the major portion of the contact material from the solvent and steam in a first separation zone, introducing the solvent and steam with a minor portion of the contact material still entrained therein into a condensing zone, bringing the solvent and steam into indirect heat exchange relationship with a cooling fluid in said condensing zone to condense the solvent and steam, spraying a small amount of a slurry of liquid solvent and contact material into said condensing zone to wash the zone free of accumulated contact material, withdrawing the condensed solvent and water and contact material admixed therewith from said condensing zone, separating the solvent from the water and admixed contact material, mixing the contact material previously separated from the solvent and steam in the first separation zone with the separated solvent to form a slurry, mixing a small portion of the slurry with the contact material first separated from the solvent and steam to aid in moving said contact material to the locus of slurry mixing, introducing another small portion of the slurry into the condensing zone to serve as the previously indicated washing medium, and mixing the remaining slurry with the spent contact material withdrawn from the treating step whereby the major portion of the solvent and contact material is returned to the process.

ERIC V. BERGSTROM.
GEORGE J. VISCONTY.

REFERENCES CITED

The following references are of record in the file of this patent:

UNITED STATES PATENTS

| Number | Name | Date |
|---|---|---|
| 2,102,341 | Von Fuchs | Dec. 14, 1937 |
| 2,286,815 | Kiersted | June 16, 1942 |
| 2,457,556 | Heinemann et al. | Dec. 28, 1948 |